May 21, 1929.  S. C. FOURNET  1,713,896
TIRE CARRIER
Filed March 31, 1928   2 Sheets-Sheet 1

Sidney C. Fournet, Inventor

By *Wm. L. Symons*
his Attorney

May 21, 1929.  S. C. FOURNET  1,713,896
TIRE CARRIER
Filed March 31, 1928  2 Sheets-Sheet 2
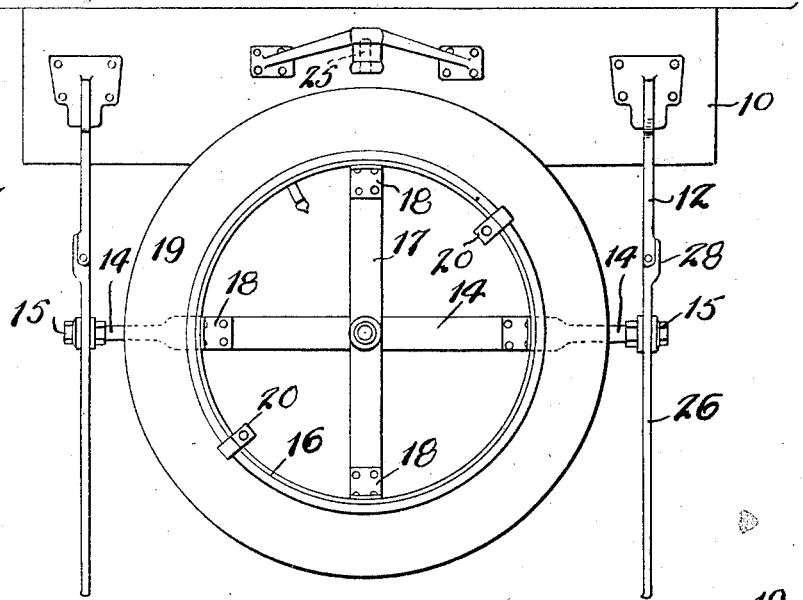
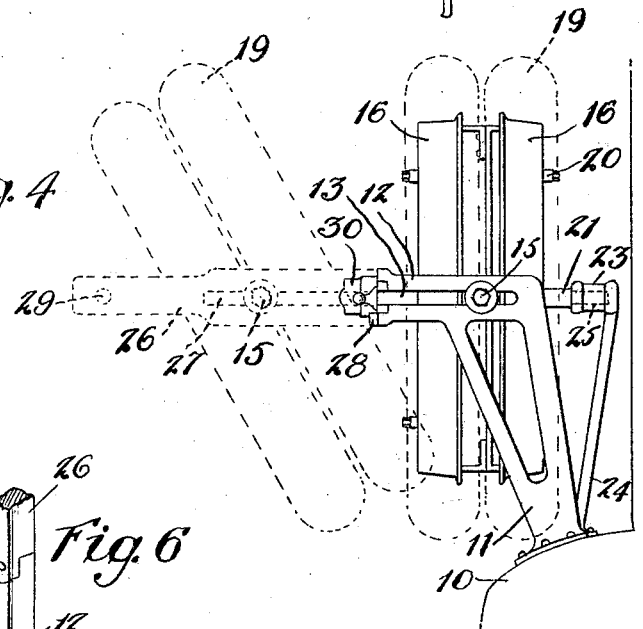
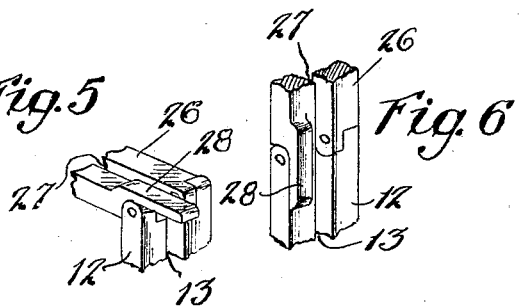
Sidney C. Fournet
Inventor
By Wm. L. Symons
His Attorney Patented May 21, 1929.

1,713,896

UNITED STATES PATENT OFFICE.

SIDNEY C. FOURNET, OF NEW ORLEANS, LOUISIANA.

TIRE CARRIER.

Application filed March 31, 1928. Serial No. 266,381.

My invention relates to improvements in tire or wheel carriers for vehicles and more especially to a carrier adapted to support a plurality of tires or wheels.

An important object of my invention is the provision of a tire carrier which is reversible.

Another object of my invention is to provide a device of the above mentioned character which is simple of construction, inexpensive to manufacture, easily installed, strong and durable.

Other objects of my invention will be apparent during the course of the following description.

In the accompanying drawings which form a part of this specification and wherein like characters of reference denote like or corresponding parts throughout the same, Figure 1 is a rear elevation of my improved carrier applied to a vehicle.

Figure 3 is a top plan view showing the carrier in a partially reversed position, Figure 4 is a side elevation thereof, Figure 5 is a detail of the joint between the arm and support, in closed position, and, Figure 6 is a detail showing the open position thereof.

Figure 1:
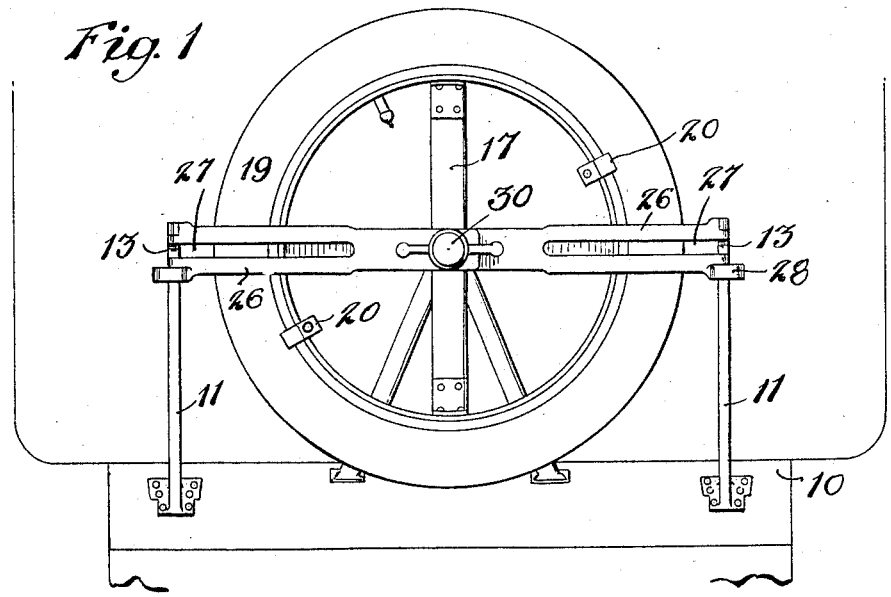

In the drawings wherein for the purpose of illustration is shown a preferred embodiment of my invention, the numeral 10 designates a portion of the rear of a vehicle to which a pair of spaced supports 11 are rigidly secured at their lower ends. The supports 11 are provided with rearwardly extending horizontal portions 12 having central longitudinally extending slots 13 which open at the rearward end of the supports.

A shaft 14 is arranged between the portions 12 of the supports and the ends of the shaft extend through the slots 13. Securing nuts 15 are screwed on the ends of the shaft 14 and when tightened up against the supports 11 prevent movement of the shaft in the slot 13. The shaft is flattened intermediate its ends, and tire or wheel supporting rims 16 are secured on either side thereof by means of the brace 17 and the angle pieces 18. Tires or wheels 19 are secured on the rims by the usual lugs 20.

A pin or securing rod 21 passes through the shaft 14 and brace 17 and is secured thereto by suitable bushings 22 or the like, said rod having reduced screw-threaded extensions on either end. A supporting member 23 is provided with legs 24 secured to the portion 10 of the vehicle and has a screw-threaded opening 25 to receive one of the reduced extensions on the rod 21.

An arm 26 is pivoted to the rearward end of each of the supporting members 12 and is provided with a slot 27 adapted to form a continuation of each of the slots 13. Each of the arms 26 is provided with an extension 28 at its outer end which projects beyond the supporting member 12 and serves as a stop to limit the outward movement of the arm when it has reached a position in alignment with the support 12, as shown in dotted lines in Figure 2.

The arms 26, when folded inwardly, overlap at their ends and are provided with openings 29 through which one of the reduced ends of the rod 21 is adapted to extend. A wing nut 30 is adapted to be screwed onto the end of the rod 21 to secure the arms in position and may be locked in any well known manner.

Figure 2:
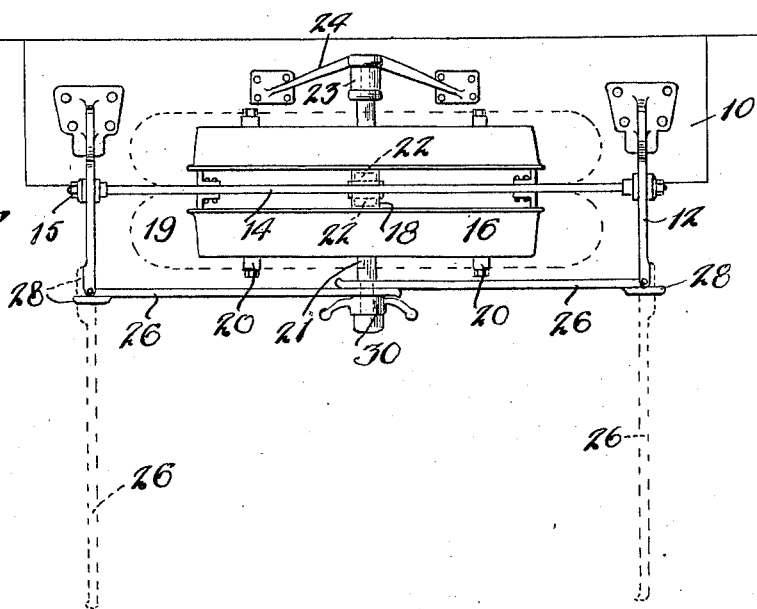
Figure 2 is a top plan view thereof.

In operation, the wing nut 30 is removed and the arms swung into their outward position as shown in Figure 2. The nuts 15 are then loosened and the shaft 14 slid away from the vehicle and into the slots 27. The tires may be reversed by swinging them about the shaft, the ends of which are journaled in the slots 27, as shown in Figure 3. The shaft is then moved up and secured to the supports and the front tire will be in position in the rear, to be readily removed.

It will be seen that I have provided a tire carrier which may be readily operated to reverse the positions of the tires without removing both tires.

While I have shown and described the preferred embodiment of my invention, it is to be understood that various changes in the size, shape, and arrangement of parts may be resorted to which do not depart from the spirit of my invention or the scope of the subjoined claims.

Having thus described my invention, what I claim and desire to protect by Letters Patent is:

1. A device of the character described comprising a pair of standards having slots therein, a pair of arms pivotally secured to the standards and having slots therein adapted to form continuations of the slots in the standards, a shaft journaled in the slots in the standards, means on said shaft to support a pair of vehicle tires, and means carried by said shaft to engage the ends of the arms and secure them in position substantially parallel to the shaft.

2. A device of the character described comprising a pair of standards secured to a vehicle and having elongated slots therein, a shaft journaled in said slots, a pair of arms pivoted to the ends of the standards and having slots therein adapted to form continuations of the slots in the standards when the arms are in position in alignment with the standards, means on said shaft for supporting a pair of vehicle tires, the shaft being arranged between the tires, and a member carried by said shaft adjacent its center and adapted to engage the arms and hold them in position substantially parallel with said shaft.

3. A device of the character described comprising a pair of standards secured to a vehicle, said standards having substantially horizontally arranged slotted portions, arms pivotally secured to the ends of the horizontal portions of the standards and having slots therein adapted to form continuations of the slots in the standard when the arms are in position in alignment with the standards, means to stop the outward movement of the arms when they are in alignment with the standards, a shaft rotatably and slidably arranged in the slots in the standard, means on said shaft between the standards for supporting a vehicle tire on each side of the shaft, and means carried by the shaft to secure the arms in position substantially parallel with the shaft.

4. A device of the character described comprising a pair of spaced parallel standards, a shaft journaled in said standards and connecting the same, a pair of arms pivotally secured to said standards and normally arranged in parallel relation with the shaft, said arms being adapted to be moved into a position whereby they form continuations of the standards, means on the shaft to support a pair of vehicle tires, and means whereby the shaft may be moved and supported on the arms when the arms are in their last-mentioned position.

5. A device of the character described comprising a pair of spaced standards secured to a vehicle, a pair of arms pivotally secured to the standards, a shaft journaled for rotation between the standards, means allowing movement of the shaft longitudinally of the standards, means on the shaft to support a pair of vehicle tires, a rod arranged transversely of said shaft, means on the vehicle for receiving one end of the rod, and means on the pivoted arms to receive the other end of the rod.

In testimony whereof I affix my signature.

SIDNEY C. FOURNET.